May 14, 1968
C. R. STRUCK
3,382,716
METERING APPARATUS
Filed Oct. 24, 1965
3 Sheets-Sheet 1
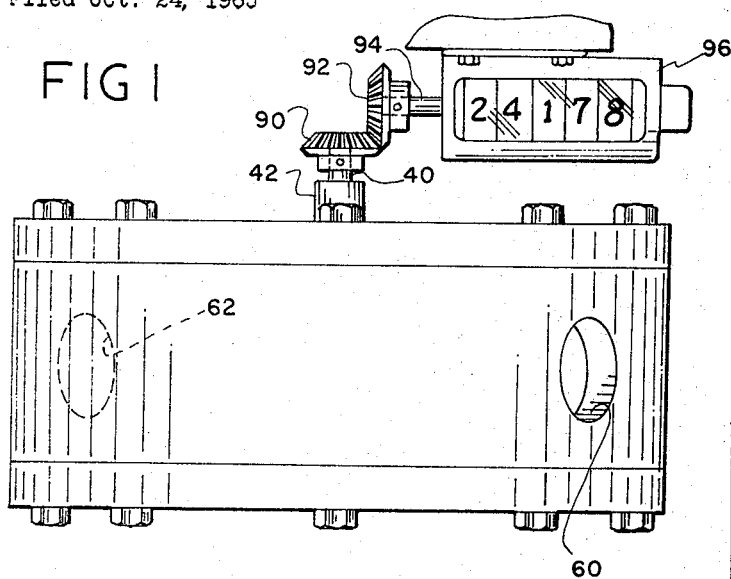
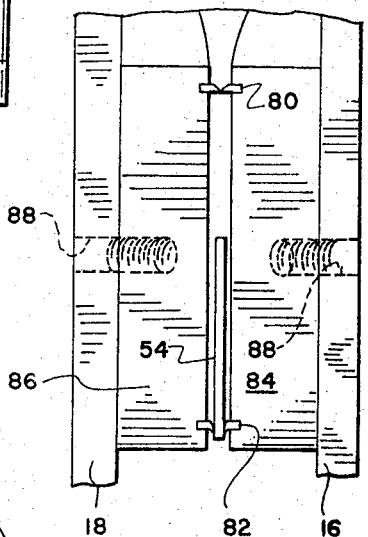
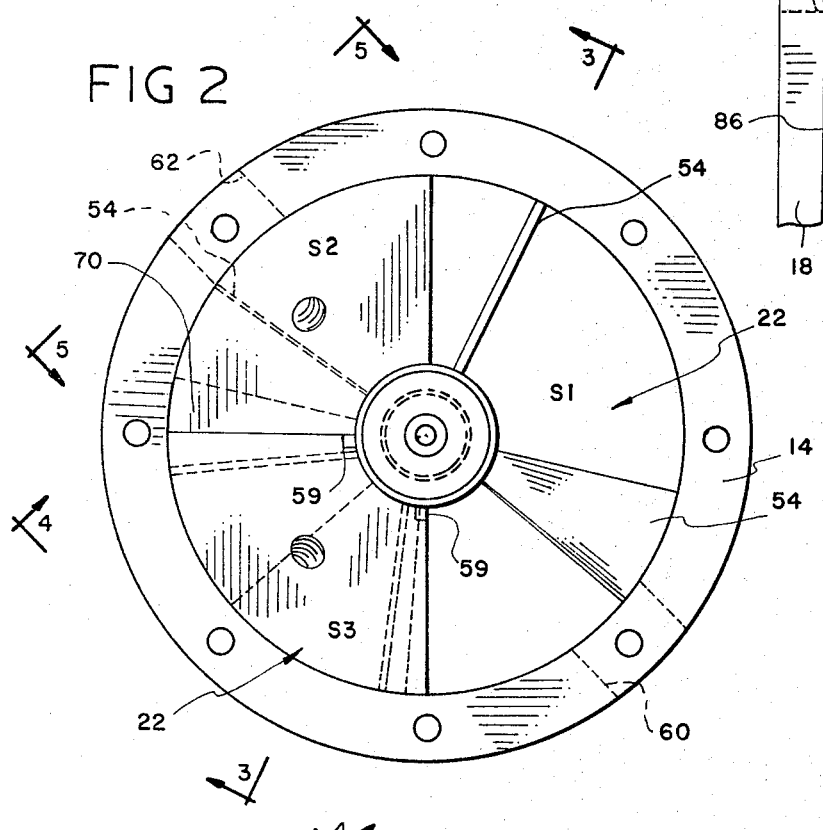
INVENTOR
CHARLES R. STRUCK
BY Norman Gerlach
ATT'Y May 14, 1968  C. R. STRUCK  3,382,716
METERING APPARATUS
Filed Oct. 24, 1965  3 Sheets-Sheet 2
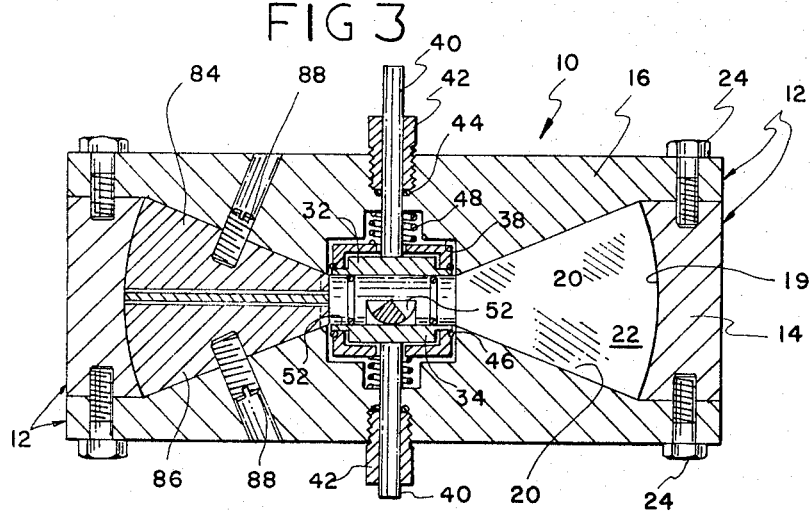
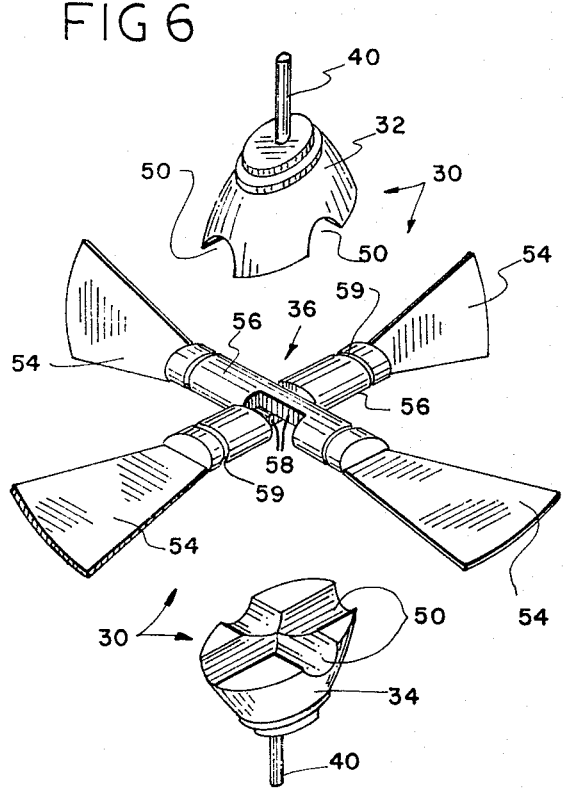
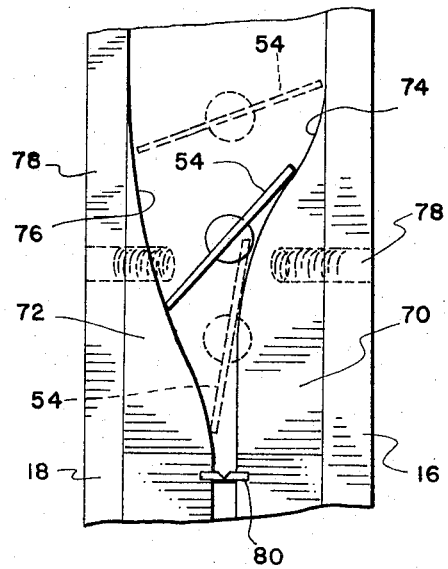
INVENTOR
CHARLES R. STRUCK
BY
ATT'Y May 14, 1968 C. R. STRUCK 3,382,716
METERING APPARATUS
Filed Oct. 24, 1965 3 Sheets-Sheet 3

INVENTOR
CHARLES R. STRUCK
BY Norman Gerlach
ATT'Y

United States Patent Office 3,382,716
Patented May 14, 1968

3,382,716
METERING APPARATUS
Charles R. Struck, Santa Barbara, Calif., assignor, by mesne assignments, to Houdaille Industries, Inc., Buffalo, N.Y., a corporation of Michigan
Filed Oct. 24, 1965, Ser. No. 504,829
6 Claims. (Cl. 73—229)

ABSTRACT OF THE DISCLOSURE

A fluid meter of the impeller type which includes a casing having a fluid inlet and a fluid outlet formed therein in communication with a torodial chamber within the casing in which is disposed a rotatable impeller having a plurality of flat vanes which are moved through the chamber and which are oscillatable between a first position at which the vanes extend at right angles to the stream of fluid in the chamber between the inlet and outlet openings to a second position at which the vanes are feathered with respect to the fluid stream. Lip seals are provided in the chamber in the region thereof in which the vanes are in the feathered positions thereof to prevent leakage of fluid past the feathered vanes.

The present invention relates generally to a fluid metering apparatus and has particular reference to a volumetric turbine type flow meter for measuring the rate of flow of a fluid through a fluid line wi h an accuracy which has hitherto been unattainable in connection with conventional or standard flow meters. The metering apparatus of the present invention, although designed primarily for use in connection with measurements of liquid flow, is not necessarily limited to such use and a metering apparatus embodying the principles of the invention may, if desired and with or without modification as required, be employed for measuring the flow of gaseous fluids in a gas stream or conduit. Irrespective, however, of the particular use to which the invention may be put, the essential features thereof are at all times preserved.

One standard volumetric liquid flow metering apparatus currently in use operates upon a fan blade deflection principle wherein a series of fan blades on a rotating shaft and at an incline to the direction of flow of the liquid is immersed in the liquid stream. Such a metering apparatus is unreliable for precise flow measurements for several reasons, one being that its slip factor is not uniform over a wide range of flow rates. At extremely low flow rates the metering apparatus may not function due to the frictional forces operating upon the fan blade shaft and the liquid will by-pass the fan blades without turning them. At extremely high flow rates, the turbulence that is created by the fan blades themselves may affect the metering output inasmuch as the pressure drop on the downstream side of the blades does not follow a uniform or linear increase as higher flow rates are encountered. Unless the outer ends of the fan blades are close to the conduit wall, which is of necessity cylindrical, liquid by-passing will result and where close proximity is maintained, eddy curents are set up that affect the metering output. Many other factors, too numerous to mention, are known to render such a metering apparatus unreliable in practice.

Another conventional or standard metering apparatus currently in use relies for its operation upon a paddle wheel effect. Such apparatus employs intermi.tently submerged paddles on a rotating output shaft, and unless the liquid conduit is rectangular and the paddles have an a ea equal to the transverse cross sectional area of the liquid stream, such apparatus can only approximate true liquid flow when such flow falls within predetermined flow rate limits. Splashing of liquid and air bubble entrainment are further factors which render an apparatus of the lastmentioned type or character unreliable.

By-pass metering apparatuses, whatever principle of operation may be involved, are obviously capable of only approximate liquid flow inasmuch as the factors which retard the flow of liquid through the by-pass conduit are not present in the main liquid stream and these factors also vary with the rate of liquid flow in the by-pass conduit.

The present invention is designed to overcome the above-noted limitations that are attendant upon conventional or standard metering apparatuses, and toward this end, the invention contemplates the provision of an improved volumetric metering apparatus which, in one form thereof, comprises a self-contained cylindrical casing having a fluid inlet and a fluid outlet, the casing being designed for interpositioning in a fluid line so that all of the fluid in the stream will pass through the casing. Within the casing there are disposed a series of radially disposed vanes which are operatively mounted upon an output and are so mounted within the casing that they may sweep around the casing in succession past the inlet and the outlet. In one section of the casing which communicates with both the fluid inlet and the fluid outlet, the vanes are constrained to enter the fluid stream within the casing at right angles to the direction of fluid flow so that they receive the full force of fluid thereagainst and travel with the stream as it progresses from the fluid inlet to the fluid outlet. In another section of the casing which is sealed from the first section, the vanes are caused to turn about their individual radial axes so that they move into positions which are substantially at right angles to their operative positions, somewhat in the manner in which a boatsman feathers his oars. This positions the vanes so that they travel edgewise, and after they have been thus oriented, they enter a third section of the casing where they pass edgewise between a series of flexible lip seals which serve the dual purpose of sealing the third section from the first section, and also of wiping the vanes so that these vanes will not condut fluid by momentum from the outlet side of the first chamber back to the inlet side thereof and thus interfere with the driving force of fluid entering the first chamber.

An important feature of the present invention resides in the manner in which the various fluid-impelled vanes. are caused to rotate on their own axes between operative positions in the first section of the casing and inoperative positions in the third blade-wiping and sealing section of the casing. The vanes are disposed in paired diametric relationship and the vanes of each pair are fixedly connected together for rotation in unison. The thus paired vanes are disposed at right angles to each other so that as one vane assumes its edgewise relationship with respect to the general plane of vane revolution in the second and third sections of the casing, its counterpart vane in the first section assumes a broadside position with respect to the liquid stream passing through such section. All movements of which the vanes are capable are motivated solely by the motion of the fluid through the casing so that the apparatus of the present invention is properly classified as a turbine type apparatus. Not only is vane revolution around the casing a result of fluid flow in the casing, but vane rotation between the two extreme positions thereof as outlined above also is a result of such fluid flow.

The provision of a metering apparatus such as has briefly been outlined above constituting the principal object of the invention, numerous other objects and advantages, not at this time enumerated, will readily suggest themselves as the nature of the invention is better understood.

In the accompanying three sheets of drawings forming a part of this specification, two illustrative embodiments of the invention are shown.

In these drawings:

FIG. 1 is a side elevational view of a metering apparatus embodying one form or embodiment of the present invention, such view showing the apparatus operatively connected to a rate counter;

FIG. 2 is a plan view of the apparatus of FIG. 1 with the cover plate removed in order more clearly to reveal the nature of the invention;

FIG. 3 is a sectional view taken on the line 3—3 of FIG. 2;

FIG. 4 is a sectional view taken in the direction indicated by the arrows of line 4—4 of FIG. 2, the section being taken just within the curved confines of the outer casing of the apparatus;

FIG. 5 is a sectional view similar to FIG. 4 but in the direction of the arrows of line 5—5 of FIG. 2;

FIG. 6 is an exploded perspective view of the turbine assembly of the apparatus;

Figure 7:
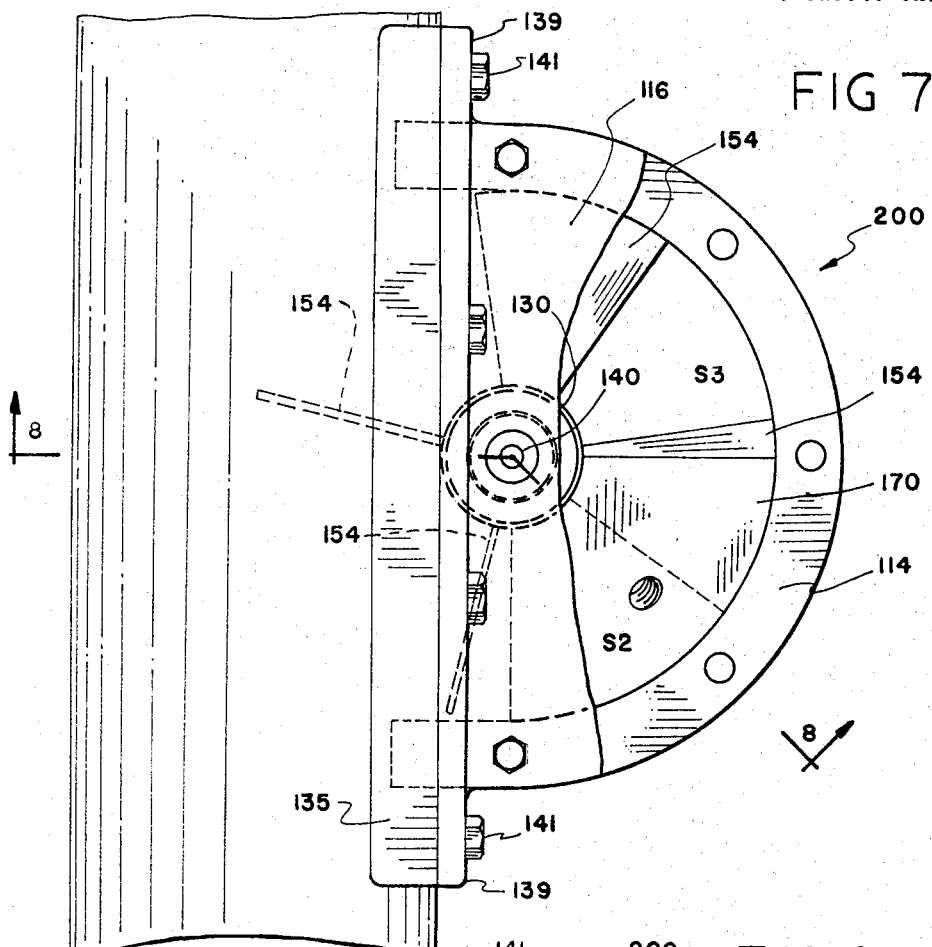
FIG. 7 is a plan view of a modified form of metering apparatus showing the same operatively applied to a flow line, a portion of the casing structure being broken away in order more clearly to reveal the nature of the invention.

Referring now to the drawings in detail and in particular to FIG. 1 to 5, inclusive, one form of the metering apparatus of the present invention is designated in its entirety by the reference numeral 10 and involves in its general organization a generally cylindrical casing 12 including a relatively thick annular side wall 14, a top closure plate 16, and a bottom closure plate 18. The side wall 14 is formed with a frusto-spherical inner wall surface 19 while the top and bottom closure plates are provided with frusto-conical wall surface sections 20 which are of large slant angle and small slant height and project into the internal chamber 22 that is defined by the cylindrical wall 14 and plates 16 and 18. This chamber is of toroidal configuration and tapers radially outwardly as clearly shown in FIG. 3. Screws 24 serve to secure the closure plates in position on the side wall 14.

Rotatably journalled in the top and bottom plates 16 and 18 and largely confined within the internal chamber 22 is a turbine assembly which is designated in its entirety by the reference numeral 30 and is illustrated in detail in FIG. 6. The turbine assembly 30 includes a two-part separable turbine hub consisting of upper and lower hub sections 32 and 34, and, in addition, a turbine rotor 36 which is carried by the hub. Each hub section is nested within a socket 38 in one of the closure plates and is provided with an output shaft 40 which projects vertically and centrally through the associated closure plate. Threaded bushings 42 serve to center the shafts 40, and O-ring seals 44 are provided for preventing liquid from passing outwardly of the chamber 22. Additional O-ring seals 46 serve to seal the hub sections 32 and 34 to the walls of the sockets 38.

As best seen in FIG. 6, the two hub sections 32 and 34 are of bell shape configuration and these hub sections oppose each other in contiguity and are spring-pressed or biased as at 48 toward each other. Semi-cylindrical trough-like recesses 50 are formed in the opposing faces of the two hub sections 32 and 34 and cross each other at right angles so that when the two sections are in contiguity, these recesses define cylindrical cross bores 52 within which certain turbine blade-carrying shafts are rotatably mounted as will be described presently.

Still referring to FIG. 6, the turbine assembly 30 includes a series of four turbine vanes 54 of generally trapezoidal configuration, the vanes being arranged in interconnected pairs and the blades of each pair being carried at the ends of an associated shaft 56. The two shafts 56 cross each other at right angles and each shaft is rabbeted on a 270° bias as indicated at 58 with the two rabbeted sections loosely interfitting as clearly shown in FIGS. 3 and 6. Since the shafts 56 are rotatable in their respective bores 52 between the hub sections 32 and 34, each shaft and, consequently, the vanes 54 carried thereby, is independently oscillatable through an agle of 180° but only at such time as the position of the other shaft is such as to permit such 180° oscillation. O-ring seals 59 are carried by the shafts 56 and cooperate with the bores 52 in preventing diametric short circuiting of liquid across the casing 12 from the sector S1 to either of the sectors S2 and S3. The vanes 54 of each pair are disposed at an angle of 90° to each other for purposes that will be made clear subsequently.

Referring now to FIG. 2, for purposes of description, the toroidal chamber 22 within the casing 12 may be regarded as being divided into three sectors, namely, the 180° sector labelled S1, and the two 90° sectors labelled S2 and S3. The annular side wall 14 is formed with a fluid inlet opening 60 in communication with the sector S1, while a fluid outlet opening 62 is in communication with the sector S2 at a region diametrically disposed from the inlet opening 60.

The vanes 54, in addition to being oscillatable with the shafts 56 on which they are mounted, are capable of revolution around the vertical axis of the casing 12 as the entire rotor assembly 30 rotates within the casing. Such rotation of the turbine assembly is under the influence of fluid flow through the sector S1 and a portion of the sector S2 from the fluid inlet opening 60 to the fluid outlet opening 62 as will be described presently. During such revolution of the vanes 54, the angular position of the vanes is repeatedly altered so that as they individually enter the sector S1, they are constrained to assume an upright or vertical position shortly after they sweep past the inlet opening 60 and to assume a prone or horizontal position shortly after they pass the outlet opening 62. To accomplish this vane orientation, the sector S2 is provided with a pair of opposed cam plates 70 and 72 (see FIGS. 2 and 5) presenting opposed cam surfaces 74 and 76, respectively, which oppose each other and between which the vanes 54 are adapted to travel during revolution thereof about the central axis of the casing. Screws 78 serve to secure the cam plates in position on the two closure plates 16 and 18, respectively.

The opposed cam surfaces 74 and 76 define therebetween a gradually narrowing passageway 80 the opposite sides of which are so contoured that the vanes 54 which successively enter the wide end of the passageway in broadside fashion are constrained to turn gradually on their axes and assume an edgewise or feathered position with respect to their arcuate path of travel as they leave the narrow end of the passageway. This gradual turning of the vanes 54 is schematically illustrated in FIG. 5. Because the vanes 54 at the ends of the shafts 56 are disposed at right angles to each other, this progressive orientation of each vane toward an edgewise position in the sector S2 of the casing 12 will cause a similar progressive orientation of its counterpart vane in the sector S1, the circumferential disposition of the cam plates 70 and 72 being such that the vanes 54 will assume their vertical positions at such times as they move past the inlet opening 60 in the sector S1 of the chamber 22. Thus, the full force of fluid passing through the chamber 22 from the inlet to the outlet will serve to act upon the vanes and induce rotation of the turbine assembly 30 as a whole.

The vanes 54, upon leaving the sector S2 in an edgewise condition of travel, enter the sector S3 where they are acted upon by first and second pairs of opposed elastomeric lip seals 80 and 82 which serve the dual function of sealing the third sector S3 from the first sector S1 and also of preventing any fluid which may gain circumferential momentum in the sector S3 from being carried into the sector S1. In effect, the lip seal 80 serves as an entrance gate and the lip seal 82 serves as an exit gate. Said gates are forcibly opened by contact with the vanes 54 to allow passage of the vanes therethrough and close immediately after such passage. The lip seals 80 and 82 are carried, respectively, in plates 84 and 86 (see FIG. 4) which are secured by screws 88 to the top and bottom closure plates 16 and 18 and define a narrow passageway 90 therebetween for edgewise passage of the vanes 54.

From the above description, it will be readily apparent that because the vanes 54 assume their vertical positions in the sector S1 shortly after they have passed the inlet opening 60 and thus closely interfit with the three confining wall surfaces 19, 20, 20 (see FIG. 1) liquid cannot short circuit past these vanes in a circumferential direction and each vane receives the full motive force of liquid behind it for driving the turbine assembly 30 in the counterclockwise direction indicated by the arrow in FIG. 2. The liquid which is in advance of each vane is thus impelled toward the liquid outlet 62. For each range of movement of a given vane 54 from the time it reaches a cut-off point with respect to the liquid inlet 60 until the time it reaches a cut-off point with respect to the liquid outlet 62, a measured quantity of liquid equal to the volumetric area involved between these two positions of the vane will be discharged from the casing 12. The rate of rotation of the turbine assembly 30 is thus an accurate representation of the quantity of liquid passing through the casing. The presence of the lip seals 80 and 82 insures that little if any liquid will be short circuited circumferentially around the toroidal chamber 22 to alter the accuracy of the metering or measuring function of the turbine assembly 30.

Either of the two output shafts 40 is available for performing useful work, as, for example, in actuating a Veeder type counter or other registering or recording mechanism. For illustrative purposes and as shown in FIG. 1, the upper output shaft 40 carries a bevel gear 90 which meshes with a similar bevel gear 92 on the input shaft 94 of a conventional Veeder counter 96 which may be calibrated to register the volume fo liquid passing through the casing 12. If desired, the output shaft 40 may be operatively connected to various other forms of mechanism for performing useful work, as, for example, to a suitable circuit making and breaking device which, in operation, controls the functioning of a volumetric injection apparatus for repeatedly introducing measured quantities of a liquid such as chlorine or fluorine into a body of water. Irrespective, however, of the particular use to which the present metering apparatus may be put, the essential features of the invention are not disturbed.

Figure 8:
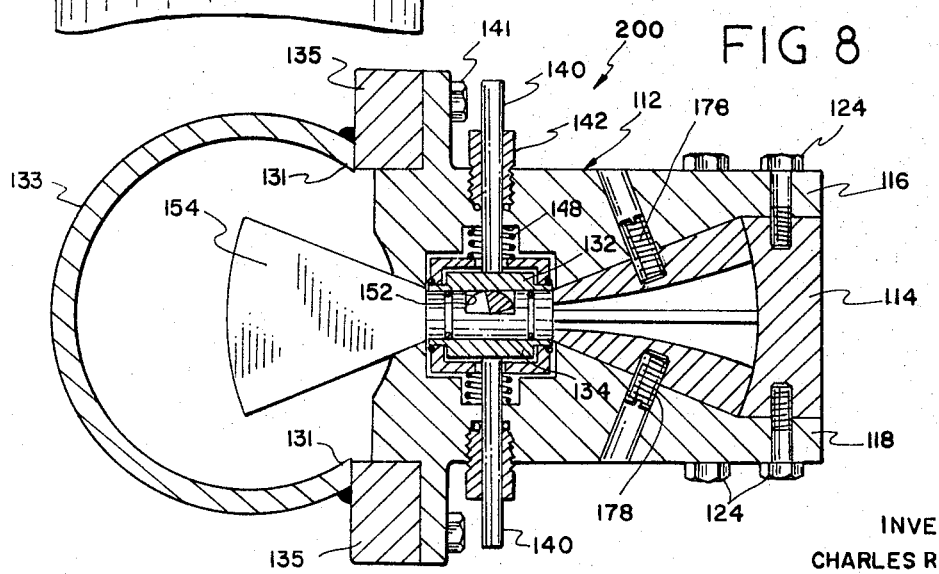
FIG. 8 is a sectional view taken on the line 8—8 of FIG. 7.

In FIGS. 7 and 8 a slightly modified form of metering apparatus 110 is shown. Due to the similarity between certain elements, portions and sub-assemblies which are common to the two forms of the invention, and in order to avoid needless repetition of description, similar reference numerals but of a higher order have been applied to the corresponding parts as between the disclosures of FIGS. 3 and 8.

In the form of the invention shown in FIGS. 8 and 9, the turbine assembly 130 remains substantially identical to the turbine assembly 30, but the casing structure 112 with which it is associated is devoid of the sector S1. Instead, this sector is, in effect, replaced by providing an opening 131 in the side wall of a fluid conduit such as the pipe 133 and mounting an attachment plate 135 on the pipe by welding or otherwise as indicated at 137. The casing 112 is provided with a bolting flange 139 which is secured by bolts 141 to the attachment plate 135 so that the adjacent portion of the casing registers with and projects into the pipe opening 131. The casing wall 114, instead of being completely cylindrical, is of approximately 180° extent, the sector S1 being omitted and the vanes 154 being of such radial extent that they may project through the opening 131 and enter the confines of the pipe 133 as they emerge from the sealing sector S3 after having previously been brought to their horizontal positions in the sector S2 in the manner previously described in connection with the vanes 54.

It is to be noted that although the vanes 154 do not completely block the passage of liquid flowing in the pipe 133 since these vanes are not contoured in conformity with the cross-sectional shape of the pipe, there will be some short circuiting of liquid past the vanes. However, due to the combined sealing and wiping action of the lip seals within the sector S3, the usual churning action which takes place with a conventional paddle-type metering apparatus is not present in connection with the metering apparatus 110 of the present invention. The various vanes 154 enter the liquid stream within the pipe 133 edgewise and thus quietly slip into the stream with very little turbulence being involved. After they have entered the stream, they then gradually become oriented to their broadside position as heretofore described where they receive the full impelling force of the moving stream. In a similar manner they are progressively turned edgewise as they leave the liquid stream so that they may emerge therefrom with a minimum of turbulence. As is the case in connection with the previously described form of the invention, either of the output shafts 140 may be put to useful work, either by actuating a Veeder or other type of counter or registering mechanism, or by actuating suitable injection apparatus as previously indicated.

The invention is not to be limited to the exact arrangement of parts shown in the accompanying drawings or described in this specification as various changes in the details of construction may be resorted to without departing from the spirit or scope of the invention. Therefore, only insofar as the invention is particularly been pointed out in the accompanying claims is the same to be limited.

Having thus described the invention what I claim as new and desire to secure by Letters Patent is:

1. In a fluid metering apparatus,
   a casing providing an internal toroidal chamber having substantially diametrically disposed openings therein establishing a fluid inlet opening and a fluid outlet opening for the chamber, an impeller mounted for rotation within said chamber and including a series of radially disposed flat impeller vanes shaped conformably to the radial cross-sectional shape of the chamber torus and adapted, upon rotation of the impeller, to sweep in circumferential fashion around the chamber torus past said fluid inlet and said fluid outlet successively and in the order named,
   means effective during progression of the vanes in the torus between said inlet opening and said outlet opening constraining the vanes to assume positions wherein they bridge the torus crosswise and thus are subject to the full impelling force of fluid flowing in the torus between the fluid inlet opening and the fluid outlet opening,
   means effective during progression of the vanes in the torus between said outlet opening and said inlet opening constraining the vanes to assume feathered positions wherein they travel edgewise through the torus, and
   means within said torus between said outlet opening and the inlet opening and in the region of the thus feathered vanes for restraining fluid from short circuiting through the torus under the impelling influence of the moving vanes,
      said restraining means comprising a pair of flexible lip seals disposed within the torus on opposite sides of the path of travel of the vanes when the latter are in their feathered positions and engageable with the opposite sides of the vanes in sliding relationship with repect thereto.

2. The fluid metering apparatus as defined in claim 1 wherein the vanes are individually rotatable about their respective radial axes, and wherein the constraining means for causing the vanes to assume their feathered positions comprises an element fixedly disposed within the torus and establishing a cam surface effectively engageable with sucessive vanes passing around the torus for shifting their positions.

3. In a fluid metering apparatus,
a casing providing an internal toroidal chamber having substantially diametrically disposed openings therein establishing a fluid inlet opening and a fluid outlet opening for the chamber,
an impeller mounted for rotation within said chamber and including an impeller hub coaxial with the chamber,
said hub being provided with a diametrically disposed bore therethrough,
a shaft rotatable in said bore and projecting outwardly therefrom in radial fashion on opposite sides of the hub, a substantially flat impeller vane carried by each projecting portion of the shaft,
the two vanes being so disposed with respect to the shaft that their general planes extend at a right angle to each other,
said vanes being shaped conformably to the radial cross-section of the torus chamber and being positioned to sweep in circumferential fashion around the torus chamber past said inlet and outlet openings successively and in the order named upon rotation or the impeller,
means disposed within the torus chamber on the side thereof remote from said inlet opening and positioned in the path of movement of the vanes for engaging each vane and contraining it to assume a feathered position of edgewise travel in the torus chamber whereby the other vane will be constrained to assume a position of broadside travel in the torus chamber on the other side of the latter, and
means disposed within the torus chamber and in the vicinity of the feathered vane for restraining fluid from short circuiting through the torus chamber under the impelling influence of the moving vanes,
said restraining means comprising a pair of flexible lip seals disposed within the torus chamber on opposite sides of the path of travel of the vanes when the latter are in their feathered positions and between which lip seals the feathered vanes are adapted to pass in sliding relation with respect thereto,
said lip seals, when out of contact with said vanes, being engageable with each other and establishing a gate seal against passage of fluid in the torus under the impelling influence of the vanes.

4. Fluid metering apparatus responsive to the rate of flow of fluid in a fluid stream comprising:
a rotatable impeller disposed in the immediate vicinity of the stream and including an impeller hub having a diametrically disposed bore extending therethrough,
a shaft freely rotatable in said bore and projecting outwardly therefrom in radial fashion on opposite sides of the hub, a substantially flat impeller vane carried by each projecting portion of the hub,
the two vanes being so disposed with respect to the shaft that their general planes extend at a right angle to each other,
said impeller being disposed so that upon rotation thereof the two vanes enter and leave the fluid stream successively in paddle wheel fashion,
means disposed exteriorly of the fluid stream and positioned in the path of movement of successive vanes constraining each vane to assume a feathered position of edgewise travel exteriorly of the stream whereby the other vane within the stream will assume a broadside position of travel under the impelling influence of fluid moving in the stream, and
means disposed exteriorly of the fluid stream and engageable with the opposite sides of the feathered vanes for wiping the vanes clear of adhering fluid and thus preventing short-circuiting if fluid around the impeller exteriorly of the fluid stream.
said wiping means comprising a pair of lip seals engageable with the opposite sides of the feathered vanes upon passing,
said lip seals being engageable with each other when out of contact with the vanes and establishing a narrow gate opening through which the feathered vanes are adapted to forcibly to pass.

5. A fluid meter comprising:
a casing having a toroidal chamber therein,
inlet and outlet openings formed in opposite sides of said casing and in communication with said chamber, and a turbine assembly in said casing comprising
a hub journalled for rotation, means forming a pair of transversely extending cross-bores in said hub,
a pair of shafts carried for rotation in said bores in crossing relation and rabbeted to enable the shafts to oscillate through an angle of 180° about their axes without interfering with one another, and a pair of flat impeller vanes mounted on each of said shafts in fixed assembly at the ends thereof and at right angles to each other and situated within and conformable to the shape of said chamber,
means disposed within the torus chamber on the side thereof remote from said inlet opening and positioned in the path of movement of the vanes for engaging each vane and constraining it to assume a feathered position of edgewise travel in the torus chamber whereby the other vane on the same shaft will be constrained to assume a position of broadside travel in the torus chamber on the other side of the latter.

6. The fluid meter as defined in claim 5 wherein each of said shafts is rabbeted to permit oscillation thereof through 180° independently of the other shaft but only at such time as the position of the other shaft is such as to permit such 180° oscillation.

References Cited

UNITED STATES PATENTS

| | | | |
|---|---|---|---|
| 84,393 | 11/1868 | Tate | 73—260 X |
| 94,892 | 9/1869 | Keith | 73—260 X |
| 117,366 | 7/1871 | Ball | 73—260 |
| 905,906 | 12/1908 | McAdams | 73—260 |

FOREIGN PATENTS

| | | |
|---|---|---|
| 4,554 | 4/1879 | Germany. |

RICHARD C. QUEISSER, *Primary Examiner.*

JAMES J. GILL, *Examiner.*

EDWARD D. GILHOOLY, *Assistant Examiner.*